US012769562B2

(12) United States Patent
Rajamanickam et al.

(10) Patent No.: US 12,769,562 B2
(45) **Date of Patent: *Oct. 20, 2026**

(54) CONFIGURATION VALIDATION IN A DISAGGREGATED NETWORK OS ENVIRONMENT

(71) Applicant: Cisco Technology, Inc., San Jose, CA (US)

(72) Inventors: Jaganbabu Rajamanickam, Kanata (CA); Nagendra Kumar Nainar, Morrisville, NC (US); Madhan Sankaranarayanan, Chinnamanur (IN); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 18/650,798

(22) Filed: Apr. 30, 2024

(65) Prior Publication Data

US 2024/0281265 A1 Aug. 22, 2024

Related U.S. Application Data

(63) Continuation of application No. 17/898,924, filed on Aug. 30, 2022, now Pat. No. 12,001,856.

(30) Foreign Application Priority Data

Jun. 14, 2022 (IN) ............................. 202241033888

(51) Int. Cl.
*G06F 9/445* (2018.01)
*G06F 8/65* (2018.01)
*H04L 45/02* (2022.01)

(52) U.S. Cl.
CPC ............ *G06F 9/44505* (2013.01); *G06F 8/65* (2013.01); *H04L 45/02* (2013.01)

(58) Field of Classification Search
CPC ......... G06F 9/44505; G06F 8/65; H04L 45/02
See application file for complete search history.

(56) References Cited

U.S. PATENT DOCUMENTS 7,478,173 B1 * 1/2009 Delco .................. H04L 61/103 709/250
7,627,654 B2 12/2009 Ramanathan et al.
(Continued)

FOREIGN PATENT DOCUMENTS

WO WO2019226652 A1 11/2019
WO WO2022034482 A3 2/2023

OTHER PUBLICATIONS

The PCT Search Report and Written Opinion mailed Sep. 14, 2023 for PCT application No. PCT/US23/24136, 17 pages.

*Primary Examiner* — Aurel Prifti
(74) *Attorney, Agent, or Firm* — Lee & Hayes, P.C.

(57) ABSTRACT

A network controller deploys a first component and a second component to run concurrently on a network device. The second component is an upgraded version of the first component. The first component receives a first instance of a packet routed to the network device and has a timestamp and a first ID, and the second component receives a second instance of the packet routed to the network device and has the timestamp and a second ID. The network controller receives first functionality data for the first component and second functionality data for the second component from the network device. Based on the first functionality data and the second functionality data, the network controller determines whether to continue operating the first component or the second component on the network device.

20 Claims, 6 Drawing Sheets

(56) References Cited

U.S. PATENT DOCUMENTS 8,705,381 B2 4/2014 Gourlay et al.
9,237,075 B2 1/2016 Filsfils et al.
9,304,798 B2 4/2016 Mudigonda et al.
9,535,732 B2 1/2017 Tsirkin
9,600,309 B2 3/2017 Prawer et al.
10,476,845 B2 * 11/2019 Antony ............... H04L 63/0263
10,791,050 B2 9/2020 Varney et al.
10,826,824 B2 11/2020 Vasseur et al.
11,163,669 B1 * 11/2021 Torun .................. G06F 11/3676
11,477,270 B1 10/2022 Manoharan et al.
11,924,089 B2 3/2024 Atov et al.
12,086,639 B2 * 9/2024 Yoo ..................... G06F 11/0778
2005/0041692 A1 2/2005 Kallstenius
2007/0177523 A1 8/2007 Nagami et al.
2009/0076628 A1 3/2009 Smith et al.
2010/0287548 A1 11/2010 Zhou et al.
2011/0235503 A1 9/2011 Chen et al.
2012/0321052 A1 12/2012 Morrill et al.
2013/0265881 A1 * 10/2013 Filsfils .................... H04L 43/04 370/241
2013/0265894 A1 10/2013 Filsfils et al.
2013/0265905 A1 10/2013 Filsfils
2015/0089494 A1 3/2015 Beak et al.
2016/0357542 A1 * 12/2016 Stanton ..................... G06F 8/61
2017/0149653 A1 5/2017 Leitner
2018/0103067 A1 4/2018 Nagaratnam et al.
2018/0293152 A1 * 10/2018 Sherafat Kazemzadeh ................. G06F 11/368
2019/0013963 A1 * 1/2019 Papo ....................... G06F 9/455
2019/0014034 A1 1/2019 Allan
2019/0155597 A1 5/2019 Lander et al.
2019/0166062 A1 5/2019 Verbree et al.
2019/0219982 A1 * 7/2019 Klassen ............... G05B 19/406
2019/0296999 A1 9/2019 Dutta
2020/0099773 A1 * 3/2020 Myers ................. H04L 67/1008
2020/0125352 A1 * 4/2020 Kannan ............... G06F 11/3698
2020/0177444 A1 * 6/2020 Nelson-Gal ......... H04L 41/0866
2021/0004217 A1 1/2021 Halter et al.
2021/0286610 A1 * 9/2021 Chen ......................... G06F 8/65
2021/0349706 A1 * 11/2021 Spivak .................. G06F 9/5055
2021/0385058 A1 12/2021 Guignard et al.
2022/0045985 A1 2/2022 Bareket et al.
2022/0124031 A1 * 4/2022 Padhye ................... H04L 43/14
2022/0194775 A1 * 6/2022 Friedel ............... G06Q 20/3278
2022/0283793 A1 * 9/2022 Demarne .............. G06F 11/302
2023/0246953 A1 * 8/2023 Atov ....................... H04L 45/22 370/389
2023/0318980 A1 10/2023 Wei et al.
2023/0401072 A1 12/2023 Rajamanickam et al.

* cited by examiner

CONFIGURATION VALIDATION IN A DISAGGREGATED NETWORK OS ENVIRONMENT

RELATED APPLICATIONS

This application claims priority to U.S. patent application Ser. No. 17/898,924, filed on Aug. 30, 2022, which claims priority to India Provisional Patent Application No. 202241033888, filed on Jun. 14, 2022; the entire contents of which are incorporated herein by reference.

TECHNICAL FIELD

The present disclosure relates generally to configuration where an Operating System (OS) component upgrade, either software, hardware, or both, is tested on a live production network without disturbing the current version of the OS component on the live production network and without the need for a lab testing setup.

BACKGROUND

An increasing number of network routing and switching operating system (OS) components are disaggregated into multiple OS component, or micro/nano services, with the ability to run on the same or a different physical virtual machine (VM). In addition, organizations often deploy multiple network topologies within their organization where each network topology is designed for its own purpose. The same version of network components may not perform efficiently for all kinds of topologies. Therefore, it is imperative to find the right software version for the right topology to derive the maximum benefits out of the network. Traditionally, in order to verify that a new version of software or a new hardware configuration performs as expected, months of lab testing is required before upgrading to the new software version or hardware configuration. However, even with the excessive time and money spent on lab testing, the test results are not comparable with the real time production network given the configuration complexity of a production network. With multiple network topologies, each designed for specific purposes, the same version of network components may not perform efficiently for all kinds of topologies. Currently, there is no mechanism to compare performance, functionality, and convergence between current software versions and hardware configuration with upgrades in software versions and hardware configuration prior to deploying the new version on the production network. Thus, the ability for a customer to validate a new configuration, either a new software version, a new hardware configuration, or both, in their production network without disturbing the live production network is needed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
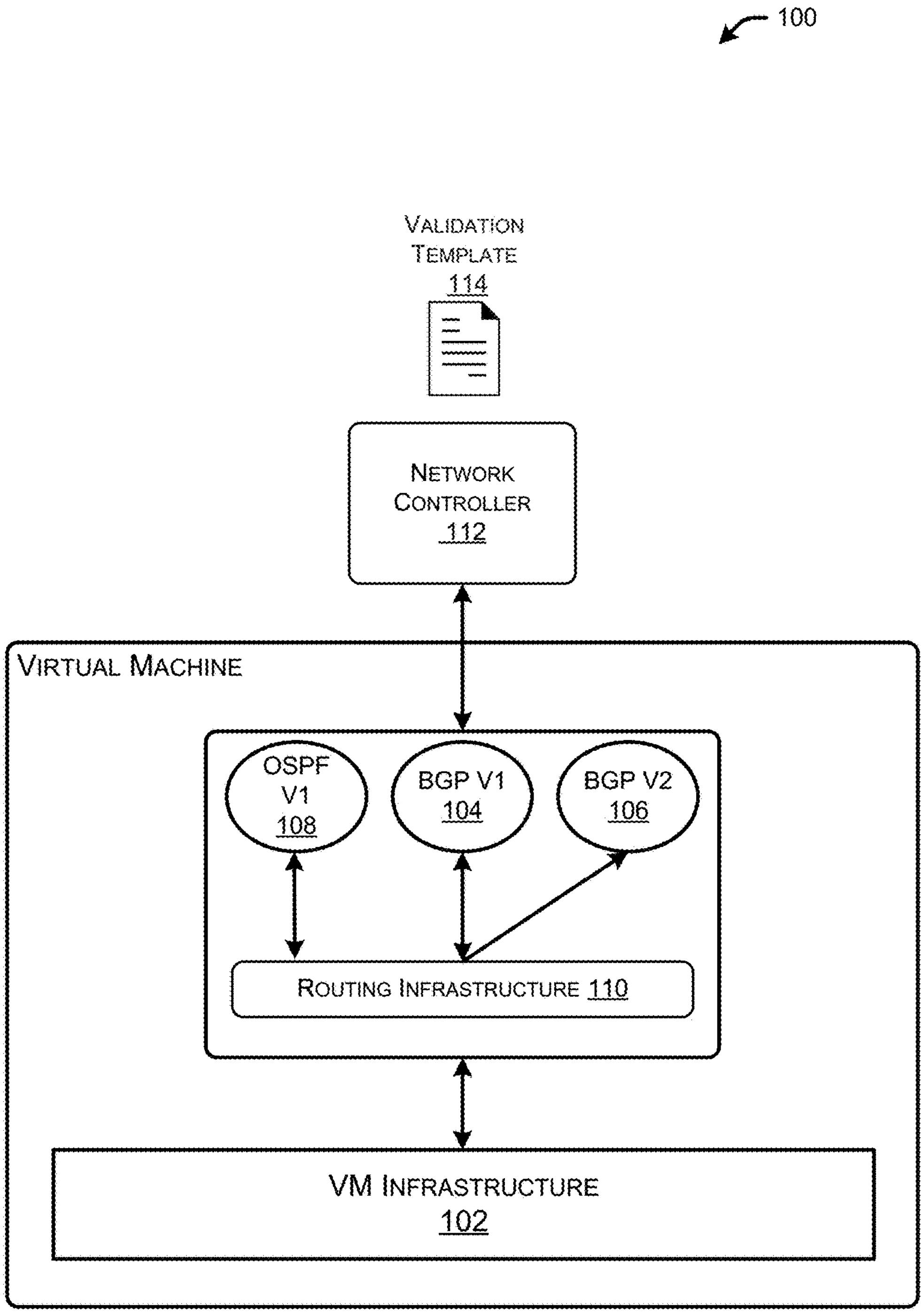
FIG. 1 illustrates a selective component validation environment for testing an upgraded OS component in a live production network.

This disclosure describes validating a new operating system (OS) component, either a software version or hardware configuration or both, in a disaggregated network by running the new OS component concurrently with the old OS component in the production network and comparing functionality data with a validation template to determine whether to replace the old OS component with the new OS component. In some instances, a method may include adding, to a network device that includes a first OS component, a second OS component to run concurrently on the networking device with the first OS component, the network device being part of a disaggregated network. Further, the method may include, transmitting, from the first OS component and to the second OS component, data comprising network routing information. The method may further include, storing the data in a memory of the second OS component. Further, the method may include registering the second OS component with a routing infrastructure of the networking device to enable the second OS component to receive packet that are routed to the first OS component. The method may further include receiving a packet routed to the first OS component. Further the method may include adding a timestamp and a first unique identifier (ID) to a first instance of the packet and transmitting the first instance of the packet to the first OS component. The method may also include adding a timestamp and a second unique ID to a second instance of the packet and transmitting the second instance of the packet to the second OS component. Also, the method may include transmitting first functionality data from the first OS component to a controller and transmitting second functionality data from the second OS component to the controller. Finally, the method may include comparing the first functionality data with the second functionality data using a validation template to determine whether to replace the first OS component with the second OS component in the network device.

This disclosure also describes validating a new operating system (OS) component, either a software version or hardware configuration or both, in a disaggregated network by adding a new semi-active route processor (RP) process that includes the new OS component and running the new RP concurrently with the old RP that includes the old OS component in the production network and comparing functionality data with a validation template to determine whether to replace the old OS component with the new OS component. In some instances, a method may include adding, to a disaggregated network that includes a first OS component running in a first route processor (RP), a second OS component in a second RP to run concurrently with the first OS component in the first RP in the disaggregated network. Further, the method may include, transmitting, from the first OS component and to the second OS component, data comprising network routing information. The method may further include, storing the data in a memory of the second OS component. Further, the method may include registering the second OS component with a routing infrastructure of the disaggregated network to enable the second OS component to receive packet that are routed to the first OS component. The method may further include receiving a packet routed to the first OS component. Further the method may include adding a timestamp and a first unique identifier (ID) to a first instance of the packet and transmitting the first instance of the packet to the first OS component in the first RP. The method may also include adding a timestamp and a second unique ID to a second instance of the packet and transmitting the second instance of the packet to the second OS component in the second RP. Also, the method may include transmitting a first convergence time from the first OS component to a controller and transmitting second a second convergence time from the second OS component to the controller. Finally, the method may include comparing the first convergence time and the second convergence time with a validation template and determining, based at least in part on the comparing whether to replace the first OS component with the second OS component in the disaggregated network.

The systems and methods described herein allow for validating a new OS component individually or a new OS component in a new semi-active RP, either a software version or hardware configuration or both, in a disaggregated network by running the new software/hardware concurrently with the old software/hardware in the production network and comparing functionality and convergence of the old software/hardware and new software/hardware using a validation template to determine whether to replace the old software/hardware with the new software/hardware.

Additionally, the techniques described herein may be performed by a system and/or device having non-transitory computer-readable media storing computer-executable instructions that, when executed by one or more processors, performs the method described above.

Example Embodiments

As mentioned above, an increasing number of network architectures are being disaggregated into micro or nano services with multiple OS components in order to achieve scalability, both horizontally and vertically. In addition, customers typically deploy multiple network topologies within an organization, each designed for its own individual purpose. As such, different OS components may perform better on some topologies than others, resulting in the need for different OS components for different topologies to maximize network efficiency and function. However, an organization may not know which OS component version is ideal for which network topology without actively running each OS component version in the active production network. However, to sufficiently determine functionality for a particular OS component version, significant network maintenance downtime is likely to occur, both to deploy a new OS component into the active network, sufficiently test for functionality in the given network topology, and potentially, remove the new OS component from the network and redeploy the original version if the new OS component does not perform as expected.

This disclosure describes techniques that enable a network controller to deploy an OS component upgrade on a live production network without disturbing the current version of the OS component on the live production network. The controller can compare performance, functionality, and convergence time of both the current OS component version and the upgraded OS component version to a validation template to determine whether to continue running the current OS component version or replace the current OS component version with the upgraded OS component. As such, network maintenance downtime and prolonged laboratory testing are eliminated or reduced. Alternately or in addition, the network controller may deploy a new semi-active instance of a route processor (RP) process with the new OS component version that needs to be upgraded (or downgraded) on a virtual machine (VM).

When a new or upgraded OS component is to be validated, the network controller will spawn or add the new OS component to a networking device (e.g., router, switch, etc.) such that the new OS component runs concurrently with the currently active OS component that is actively running in the networking device. The new OS component will register with a routing infrastructure of the network in order to receive packets that are routed to the currently active OS component. However, the new OS component will not send any updates to the routing infrastructure, the currently active OS component is still solely in charge of routing infrastructure updates such as network topology mapping and routing table updates. Additionally, the new OS component will sync with the currently active OS component in order to the receive the current network routing information and the new OS component will store the currently routing information in memory. Once the new OS component is registered with the routing infrastructure, any packets that are routed to the currently active OS component, will be timestamped. Then a first instance of the timestamped packet will be tagged with a first unique identifier (ID) and sent to the currently active OS component and a second instance of the timestamped packet will be tagged with a second unique ID and sent to the new OS component. Functionality and performance data (e.g., convergence time) for each of the currently active OS component and the new OS component will be sent to the network controller. The network controller can compare the functionality and performance data to a validation template for the particular network topology, and determine whether to replace the currently active OS component with the new or upgraded OS component. For example, if the new upgraded OS component has a faster convergence time than the currently active OS component, the network controller may determine to replace the currently active OS component with the new upgraded OS component and remove the currently active OS component from the network device. Additionally, functionality and performance data for the new OS component and the currently active OS component, may be compared to a validation template in the control plane, the data plane and the management plane before determining whether to upgrade to the new OS component or continue running the currently active OS component.

The techniques described herein may be applied to a new or upgraded OS component or micro or nano service that includes a same software version as the currently active micro service but a new and different hardware configuration. Additionally, the new or upgraded OS component may have a new and different software version but a same hardware configuration as the currently active OS components. Finally, the new OS component may include both a new software version and a new hardware configuration as compared to the currently active OS component.

Similar to the selective component validation process described above, techniques described herein can additionally be applied to system validation process. The network controller will spawn or add a new semi-active instance of a router processor (RP) process with the new or upgraded OS component, to run concurrently with the currently active RP with the currently active OS component that needs to be upgraded (or downgraded) on a same or different VM. Similar to the selective component validation process described above, the new or upgraded OS component in the semi-active RP process will sync with the currently active OS component in the currently active RP process in order to receive the current network routing information and store the current network routing information in memory. The new OS component will register with the network routing infrastructure in order to receive packets that are routed to the currently active OS component in the currently active RP. However, the new OS component in the new semi-active RP will not send any updates to the routing infrastructure, the currently active OS component in the currently active RP is solely responsible for routing infrastructure updates such as network topology mapping and routing table updates. Once the new OS component in the semi-active RP is registered with the routing infrastructure, any packets that are routed to the currently active OS component in the currently active RP, will be timestamped. Then a first instance of the timestamped packet will be tagged with a first unique identifier (ID) and sent to the currently active OS component in the currently active RP and a second instance of the timestamped packet will be tagged with a second unique ID and sent to the new OS component in the semi-active RP. Functionality and performance data (e.g., convergence time) for each of the currently active OS component and the new OS component will be sent to the network controller. The network controller can compare the functionality and performance data to a validation template for the particular network topology, and determine whether to replace the currently active OS component with the new or upgraded OS component.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 depicting a virtual machine (VM), that may reside in a network device (e.g., a router or a switch) in a portion of a live production network, a VM infrastructure 102 on which an active OS component border gateway protocol (BGP) V1 104 is running, an upgraded OS component BGP V2 106 that has been spawned or added to the VM infrastructure 102 for validation, an open shortest path first (OSPF) V1 component 108 as part of the routing infrastructure 110 and for determining network routing tables, a network controller 112, and a validation template 114 used by the network controller 112 to validate the functionality and performance of the upgraded OS component BGP V2 106 in the live production network.

As an example, consider a disaggregated network including the VM having VM infrastructure 102 running a currently active micro service or nano service OS component BGP V1 104 and OSPF V1 108 for determining routing paths through the network and populating and updating routing tables as part of the routing infrastructure 110. Using the techniques described herein, a network controller 112 can spawn or add an upgraded version OS component BGP V2 106 of the currently active OS component BGP V1 104 and can compare functionality and performance data of both BGP V1 104 and BGP V2 106 to a validation template 114 to determine whether the OS component should be upgraded to BGP V2 106 or if the OS component should continue running as BGP V1 104 for the particular network topology in which the VM with VM infrastructure 102 is a part without the cost, lab testing time, and network maintenance downtime of traditional techniques. To determine functionality and performance data of both BGP V1 104 and BGP V2 106, the network controller 112 spawns or adds the upgraded version BGP V2 106 on a same VM with VM infrastructure 102 that is running version BGP V1 104. Alternately or in addition, BGP V2 106 may be spawned external to the VM infrastructure 102 if supported by the routing infrastructure 110.

Once the new BGP V2 106 is spawn or added, BGP V1 104 will sync with BGP V2 106 and transmit current routing information to BGP V2 106. For instance, a network topology map that has been determined by OSPF V1 108 for the network in which the VM with VM infrastructure 102 resides. BGP V2 106 will then store the current routing information received from BGP V1 104 in memory. BGP V2 106 will register with the routing infrastructure 110 so that is may receive communications from the routing infrastructure 110, however, BGP V2 106 does not send any updates to the routing infrastructure 110 as indicated by the one way communication illustrated in FIG. 1. Once BGP V2 106 is registered with the routing infrastructure, any packets that are routed to BGP V1 104, will also be routed to BGP V1 106. A packet routed to BGP V1 104 will be timestamped. A first instance of the timestamped packet will also have a first unique identifier (ID) added, and be sent to BGP V1 104. A second instance of the packet with the timestamp, will have a second unique ID added and be sent to BGP V2 106. Functionality and performance data (e.g., convergence time) from BGP V1 104 and functionality and performance data from BGP V2 106 will be sent to the network controller 112. The network controller 112, will compare the functionality and performance data from both BGP V1 104 and BGP V2 106 to a validation template 114 to determine whether BGP V2 106 performs as expected and whether to replace BGP V1 104 with BGP V2 106 in the active production network, or to continue running BGP V1 104 in the active production network.

Although the above example describes a BGP OS component validation, the techniques described herein are not limited to BGP and may be an interior gateway protocol (IGP) component, a bidirectional forwarding detection (BFD) component, a spanning tree protocol (STP) component, a link layer discovery protocol (LLDP) component, or any other applicable protocol as appropriate for the network device.

Figure 2:
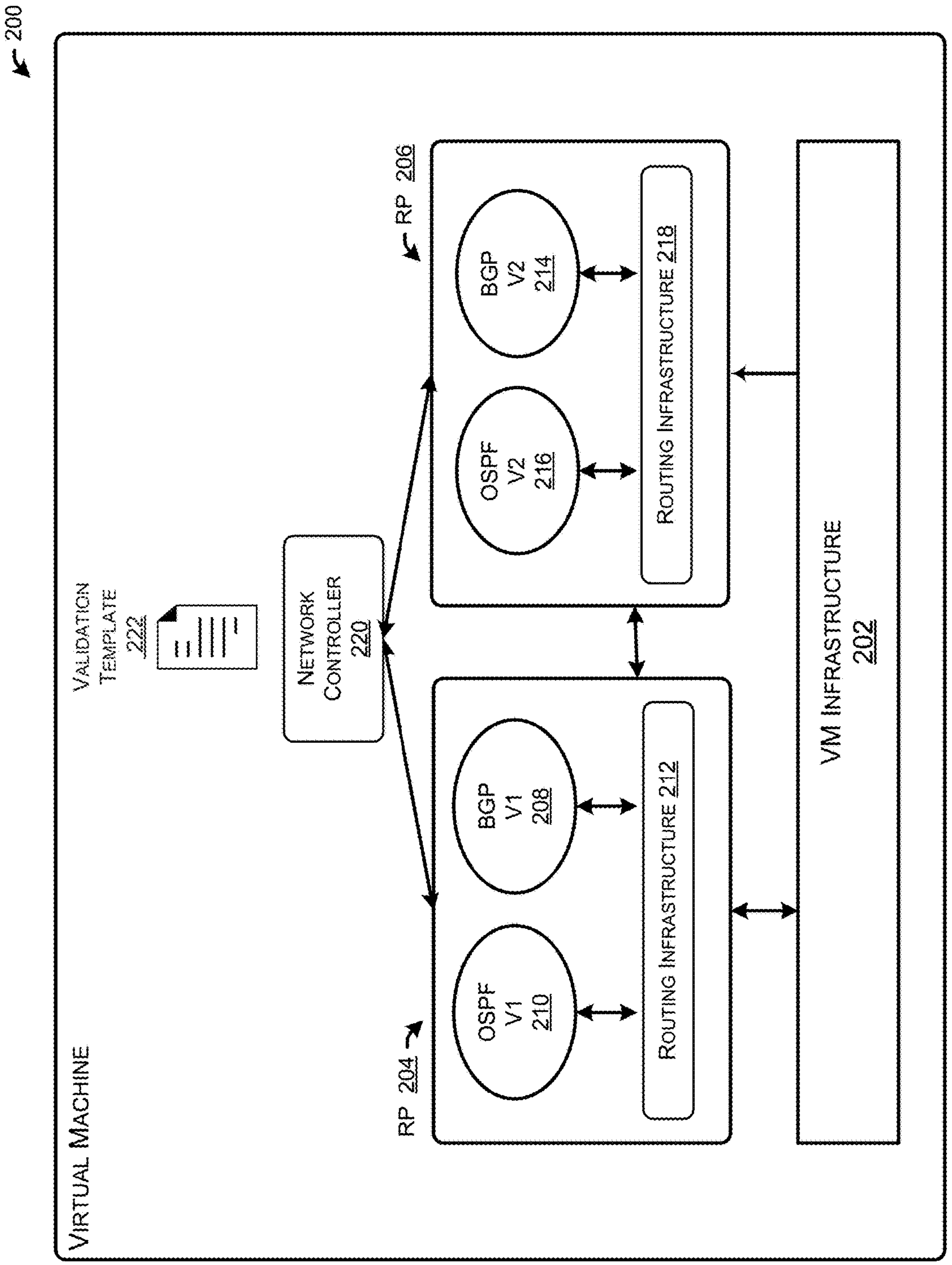
FIG. 2 illustrates a system component validation environment for testing an upgraded OS component in a live production network.

FIG. 2 illustrates an example environment 200 for validating a new or upgraded OS component on a system level instead of a selective component level as illustrated in FIG. 1. In this approach, a network controller will spawn or add a new semi-active instance of a route processor (RP) process with the new or upgraded OS component that needs to be validated to run concurrently with a currently active OS component in a currently active instance of the RP.

In the example environment 200 of FIG. 2, a disaggregated network including network devices on which one or more VMs are running micro services or nano services including multiple OS components, a VM having a VM infrastructure 202 on a network device (e.g., a PE router) is running a currently active instance of RP 204 and a network controller 220 can spawn or add a second semi-active instance, RP 206, to run concurrently with RP 204. RP 204 includes a currently active micro service or nano service OS component BGP V1 208 and OSPF V1 210 for determining routing paths through the network and populating and updating routing tables as part of the routing infrastructure 212 of RP 204. RP 206 includes a new or upgraded micro service or nano service OS component BGP V2 214 and OSPF V2 216 for determining routing paths through the network and populating and updating routing tables as part of the routing infrastructure 218 of RP 206. The network controller 220 can compare functionality and performance data (e.g., convergence time) of both BGP V1 208 and BGP V2 214 with a validation template 222 to determine whether BGP V2 214 performs as expected and whether the OS component should be upgraded to BGP V2 214 or if the OS component should continue running as BGP V1 208 for the particular network topology in which the VM with VM infrastructure 202 is a part, without the cost, lab testing time, and network maintenance downtime of traditional techniques. To determine convergence time for both BGP V1 208 and BGP V2 214, the network controller 220 spawns or adds the upgraded version BGP V2 214 to a same VM with VM infrastructure 202 that is running version BGP V1 208. Alternately or in addition, BGP V2 214 may be spawned external to the VM infrastructure 202, for example, on a different VM.

Once the semi-active instance of RP 206 including the new or upgraded OS component BGP V2 214 and OSPF V2 216 is spawned or added to the VM with VM infrastructure 202, BGP V1 208 and OSPF V1 210 will sync with BGP V2 214 and transfer current routing information to BGP V2 214 and OSPF V2 216. For instance, a network topology map for the network in which the VM with VM infrastructure 202 resides and current routing tables. BGP V2 214 and OSPF V2 216 will then store the current routing information in memory. BGP V2 214 will register with the routing infrastructure 218 to enable BGP V2 214 to receive packets that are routed to the BGP V1 208. When a packet is routed to BGP V1 208, a timestamp is added to the packet. A first instance of the packet with the timestamp has a first unique ID added and is sent to BGP V1 208. A second instance of the packet with the timestamp, has a second unique ID added and is sent to BGP V2 214. Both BGP V1 208 and BGP V2 214 will determine routes through the network and update their respective routing information base (RIB) in RP 204 and RP 206, respectively. Functionality and performance data for both BGP V1 208 and BGP V2 214 are determined and transmitted to the network controller. For example, convergence time (discussed in detail below with reference to FIG. 3) for both BGP V1 208 and BGP V2 214 are determined and transmitted to the network controller 220. The network controller 220 can compare the convergence time for BGP V1 208 and BGP V2 214 with a validation template and determine whether BGP V2 214 functions as expected, and whether to replace BGP V1 208 with BGP V2 214 in the live production network, or continue running BGP V1 208.

Figure 3:
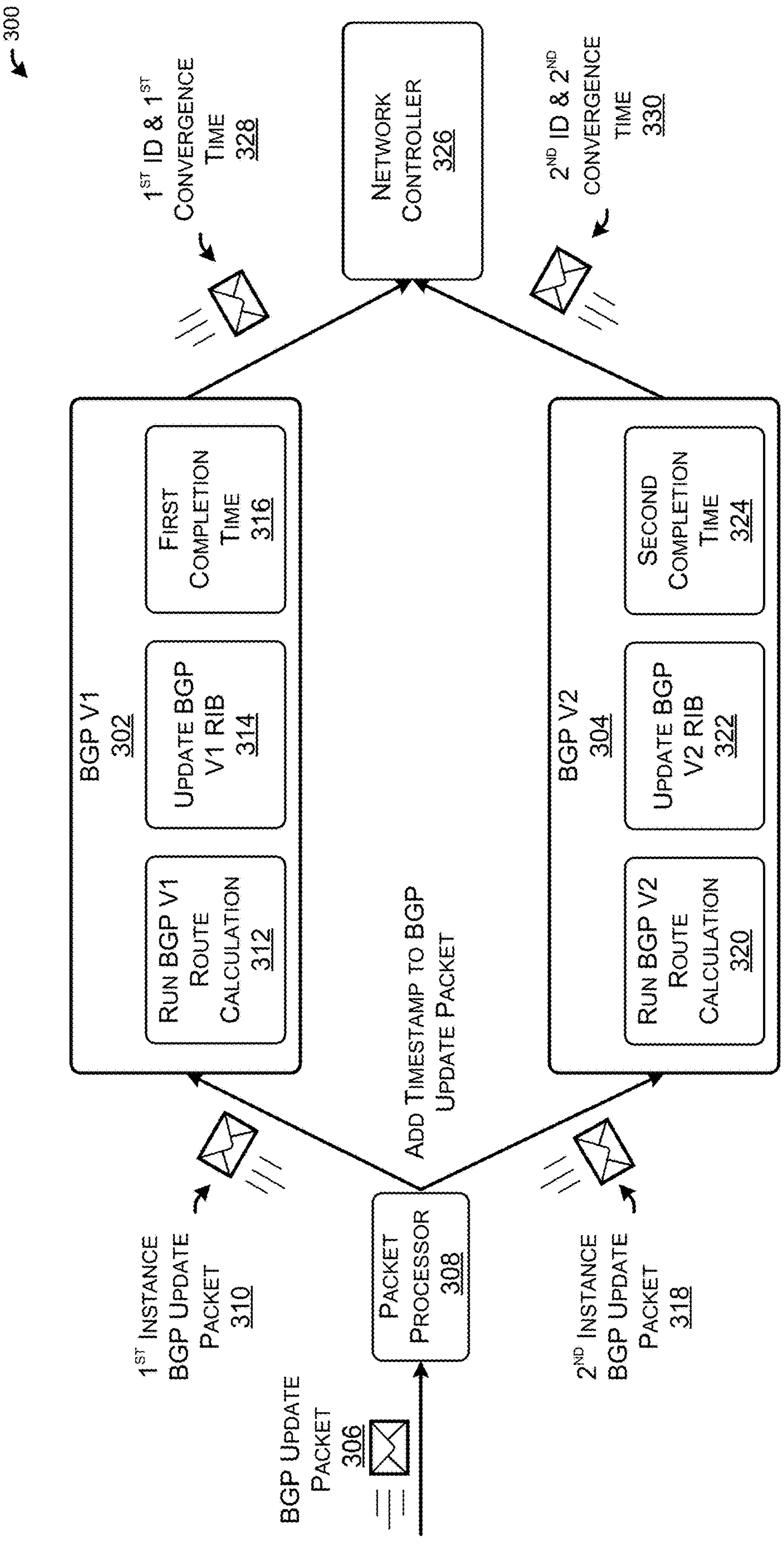
FIG. 3 illustrates an example of a validation flow for determining a convergence times and comparing a currently active OS component and an upgraded OS component in a live production network.

FIG. 3 illustrates an example environment 300 in which convergence time for a currently active OS component BGP V1 302 and a new or upgraded OS component BGP V2 304 can be calculated and compared in order to determine whether to continue running BGP V1 302 in the live production network, or replace BGP V1 302 with BGP V2 304 and remove BGP V1 302 from the live production network. To determine the respective convergence times for BGP V1 302 and BGP V2 304, when a BGP update packet 306 is routed to BGP V1 302, the BGP update packet 306 arrives at a packet processor 308. A start timestamp, a timestamp of the time that the BGP update packet 306 was received at the packet processor 308, is added to the BGP update packet 306. A first unique identifier (ID) along with the start timestamp is added to a first instance of the BGP update packet 306 to create a first instance BGP update packet 310. The first instance BGP update packet 310 is transmitted to BGP V1 302. Once BGP V1 302 receives the first instance BGP update packet 310, BGP V1 302 will run BGP V1 route calculation 312 to determine routes through the network, update BGP V1 RIB 314, and determining a first completion time 316 for the route processing. The convergence time for BGP V1 302 can then be determined by calculating a difference between the first completion time 316 and the BGP update packet 306 start timestamp. Similarly, A second unique ID along with the start timestamp is added to a second instance of the BGP update packet 306 to create a second instance BGP update packet 318. The second instance BGP update packet 318 is transmitted to BGP V2 304. Once BGP V2 304 receives the second instance BGP update packet 318, BGP V2 304 will run BGP V2 route calculation 320 to determine routes through the network, update BGP V2 RIB 322, and determining a second completion time 324 for the route processing of BGP V2 304. The convergence time for BGP V2 304 can then be determined by calculating a difference between the second completion time 324 and the BGP update packet 306 start timestamp. Once a convergence time for both BGP V1 302 and BGP V2 304 have been calculated, both convergence times with their respective unique ID's can be sent to a network controller 326. As illustrated, the first ID and the first convergence time 328 for BGP V1 302 is sent to the network controller 326. Similarly, the second unique ID with the second convergence time 330 for BGP V2 304 is sent to the network controller 326. Alternately or in addition, the ID's and convergence times for both BGP V1 302 and BGP V2 304 may be sent to a network performance analyzer for functionality and performance analysis. The network controller 326 can determine a performance metric for each BGP V1 302 and BGP V2 304, based on their respective convergence times compared with a validation template for the network topology. If the convergence time for BGP V2 304 is faster, the network controller can make a determination to replace BGP V1 302 with BGP V2 304 in the production network, and remove BGP V1 302 from the network. On the other hand, if BGP V2 304 does not perform as expected, and/or the convergence time of BGP V2 304 is not faster than the convergence time of BGP V1 302, the network controller can make the determination to continue running BGP V1 302 in the live production network and remove BGP V2 304.

The above-noted examples regarding FIG. 1, FIG. 2, and FIG. 3 are merely illustrative, and various changes may be made to achieve similar or the same results. For example, the newly spawned OS components (either the selective component, or together with a new semi-active instance of the RP) may run on a same or different VM, or may run external to the VM on which the currently active OS component is running. In addition, various performance, functionality, and features may be included in the validation template to assist in the determination on whether to upgrade an OS component or not.

Figure 4:
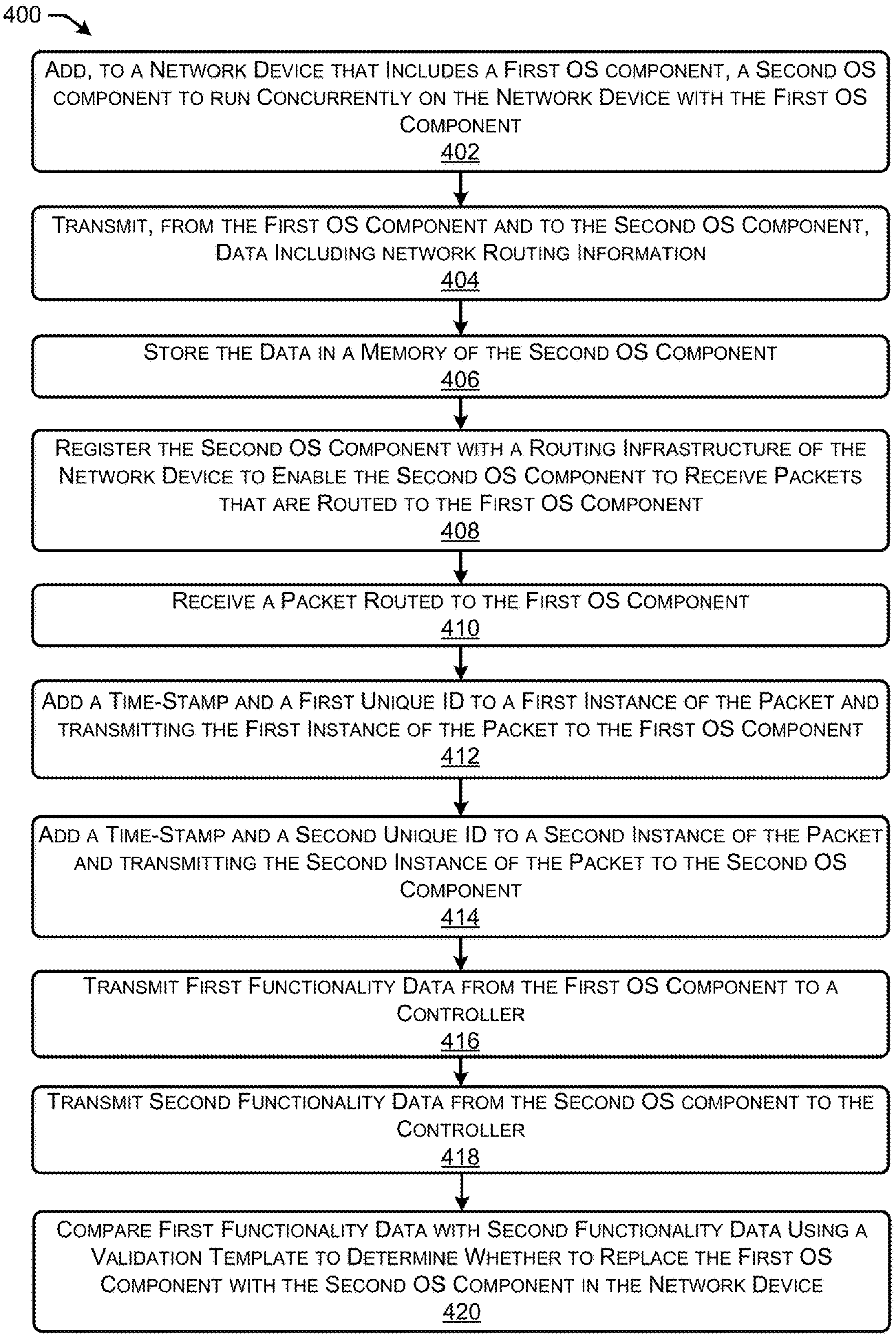
FIG. 4 illustrates a flow diagram of an example method for validating an upgraded OS component in a live production network.
Figure 5:
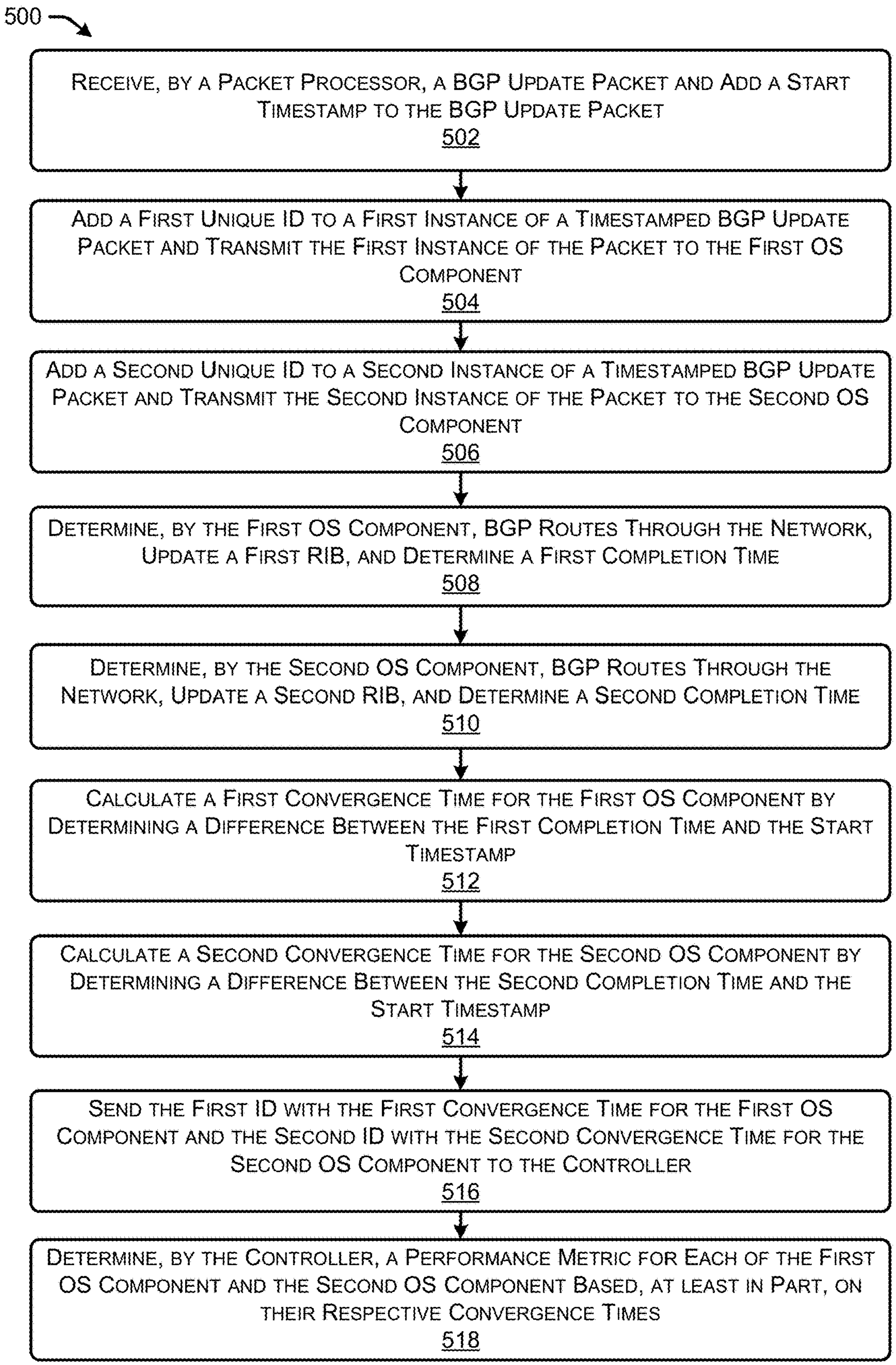
FIG. 5 illustrates a flow diagram of an example method for determining and comparing convergence time of a currently active OS component and an upgraded OS component on a live production network.

FIGS. 4 and 5 illustrate flow diagrams of example methods 400 and 500 that illustrate various aspects of the techniques of this disclosure. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for validating an OS component upgrade in a live production network without disturbing the current version of the OS component on the live production network shown in FIG. 1, FIG. 2 and FIG. 3. The operations described herein with respect to the method 400 may be performed by various components and systems, such as the components illustrated and discussed herein.

At operation 402, a network device (e.g., a PE router) that has a first OS component running on it, has a second OS component added to run concurrently with the first OS component. For example, with reference to FIG. 1, new or upgraded OS component BGP V2 106 is spawned or added to run concurrently with the currently active OS component BGP V2 104. Similarly, in FIG. 2 a new semi-active version of RP 206 with new or upgraded OS component BGP V2 214 is added to the VM with VM infrastructure 202 to run concurrently with BGP V1 208 in RP 204.

At operation 404, data including network routing information is transmitted from the first OS component to the second OS component. Referring again to FIG. 1, BGP V2 106 will sync with BGP V1 104 and receive the existing routing information, for instance a network topology map and routing tables, determined by OSPF V1 108. Although BGP V2 106 will receive routing information and ultimately instances of packets routed to BGP V1 104, BGP V2 106 will not update any routing information as illustrated with the one way communication between the routing infrastructure 110 and BGP V2 106.

At operation 406, the data including the network routing information is stored in the memory of the second OS component. The routing information BGP V2 106 receives from BGP V1 104 in operation 404 above, is stored in memory.

At operation 408, the second OS component registers with a routing infrastructure of the network device to enable the second OS component to receive packets that are routed to the first OS component. With reference again to FIG. 1, BGP V2 106 registers with the routing infrastructure 110 in order to receive packets that are routed to BGP V1 104. Similarly, in FIG. 2, BGP V2 214 registers with the routing infrastructure 218 in order to receive packets that are routed to BGP V1 208.

At operation 410, a packet routed to the first OS component is received. Packets being routed through the network that are routed to BGP V1 104 in FIG. 1, are received by the VM infrastructure 102 of the VM on which BGP V1 104 is running.

At operation 412, a timestamp and a first unique ID are added to a first instance of the packet and transmitted to the first OS component. In FIG. 1, the packet that was received at the VM infrastructure 102 in operation 410 is timestamped. A first unique ID is then added to a first instance of the packet and transmitted to BGP V1 104. Referring to FIG. 3, the BGP update packet 306 is received by the packet processor 308, and a start timestamp is added. A first instance BGP update packet 310 with a first unique ID and the start timestamp is routed to BGP V1 302.

At operation 414, a timestamp and a second unique ID are added to a second instance of the packet and transmitted to the second OS component. A second instance of the packet received by VM infrastructure 102 with the timestamp has a second unique ID added and the second instance is transmitted to BGP V2 106 FIG. 1. Referring to FIG. 3, the BGP update packet 306 is received by the packet processor 308, and a start timestamp is added. A second instance BGP update packet 310 with a second unique ID and the start timestamp is routed to BGP V2 304.

At operation 416, functionality data of the first OS component is transmitted from the first OS component to the network controller. For example, convergence time for BGP V1 104 may be determined and sent to network controller 112 as shown in FIG. 1. As shown in FIG. 3, a first ID and first convergence time 328 is sent from BGP V1 302 to the network controller 326.

At operation 418, functionality data of the second OS component is transmitted for the second OS component to the network controller. For example, convergence time for BGP V2 106 may be determined and sent to network controller 112 as shown in FIG. 1. As shown in FIG. 3, a second ID and a second convergence time 330 is sent from BGP V2 304 to the network controller 326.

At operation 420, the first functionality data and second functionality data are compared with a validation template to determine whether to replace the first OS component with the second OS component in the network device. For instance, functionality data for BGP V1 104 and functionality data for BGP V2 106 may be determined and sent to network controller 112. Network controller 112 can compare both the functionality data for BGP V1 104 and the functionality data for BGP V2 106 with a validation template 114 to determine whether to replace BGP V1 104 with BGP V2 106 in the live production network, or to continue running BGP V1 104 in the live production network.

FIG. 5 illustrate a flow diagram of an example method 500 for calculating a convergence time for a first OS component and a second OS component, and determining a performance metric for each of the first OS component and second OS component in a live production network as shown FIG. 3. The operations described herein with respect to the method 500 may be performed by various components and systems, such as the components illustrated and discussed herein.

At operation 502, a packet processor receives a BGP update packet and adds a start timestamp to the BGP update packet. For example, referring to FIG. 3, BGP update packet 306 is received by packet processor 308 where a start timestamp is added to the packet.

At operation 504, a first unique ID is added to a first instance of the BGP update packet and transmitted to the first OS component. Referring again to FIG. 3, first instance BGP update packet 310 that includes a first unique ID and the start timestamp is sent to BGP V1 302.

At operation 506, a second unique ID is added to a second instance of the BGP update packet and transmitted to the second OS component. Second instance BGP update packet 318 of FIG. 3, that includes a second unique ID and the start timestamp is sent to BGP V2 304.

At operation 508, the first OS component determines BGP routes through the network, updates a first RIB, and determines a first completion time. As illustrated in FIG. 3, first instance BGP update packet 310 is received by BGP V1 302. BGP V1 302 runs BGP V1 route calculation 312, updates BGP V1 RIB 314, and determines a first completion time 316.

At operation 510, the second OS component determines BGP routes though the network, updates a second RIB, and determines a second completion time. For example, second instance BGP update packet 318 is received by BGP V2 304. BGP V2 304 runs BGP V2 route calculation 320, updates BGP V2 RIB 322, and determines second completion time 324.

At operation 512, a first convergence time for the first OS component is calculated by determining a difference between the first completion timestamp and the start timestamp. In the example illustrated in FIG. 3, a first convergence time is determined by calculating the difference between the first completion time 316 and the start timestamp.

At operation 514, a second convergence time for the second OS component is calculated by determining a difference between the second completion timestamp and the start timestamp. Referring to FIG. 3, a second convergence time is determined by calculating the difference between the second completion time 324 and the start timestamp.

At operation 516, the first ID with the first convergence time for the first OS component, and the second ID with the second convergence time for the second OS component is sent to the controller. For example, in FIG. 3, the first unique ID and first convergence time 328 for BGP V1 302 is sent to the network controller 326. Additionally, second unique ID and second convergence time 330 for BGP V2 304 is sent to the network controller 326.

At operation 518, the controller determines a performance metric for each of the first OS component and the second OS component based, at least in part, on their respective convergence times. In FIG. 3, once network controller 326 receives both first unique ID and first convergence time 328 and second unique ID and second convergence time 330, the network controller 326 can compare both to a validation template (e.g., validation template 222 of FIG. 2) to determine their respective performance metrics.

Figure 6:
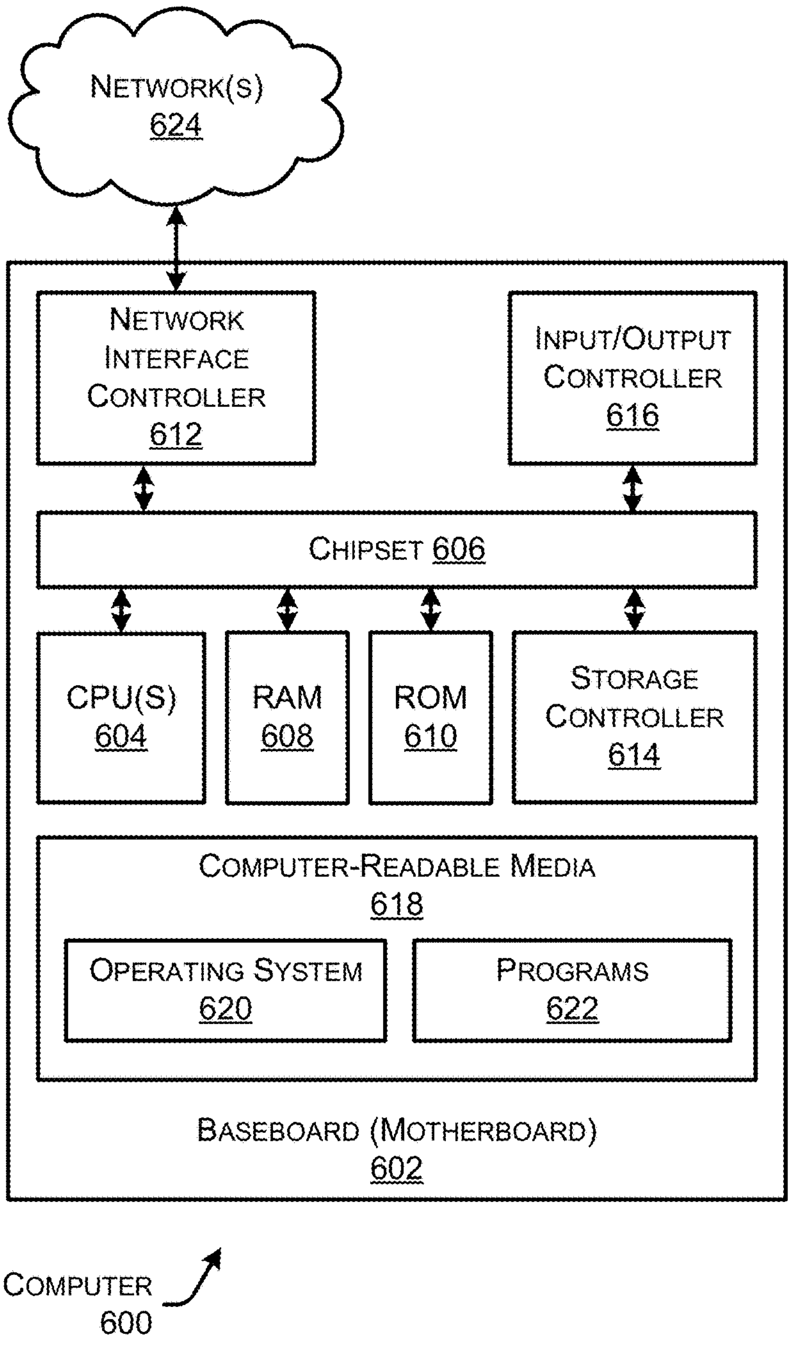
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to any of the servers, routers, or devices discussed herein. In some embodiments, computer 600 may include networked devices such as servers, switches, routers, hubs, bridges, gateways, modems, repeaters, access points, etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a Network Interface Controller (NIC) 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices described herein, and or any components included therein, may be supported by one or more devices similar to computer 600. Stated otherwise, some or all of the operations performed by the network controller 112, and or any components included therein, may be performed by one or more computer devices 600 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a router, a border router, and/or a server. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

deploying, by a network controller and to a network device, a first component and a second component to run concurrently on the network device, wherein the second component is an upgraded version of the first component, and wherein the first component receives a first instance of a packet routed to the network device, the first instance of the packet having a timestamp and a first identifier (ID), and the second component receives a second instance of the packet routed to the network device, the second instance of the packet having the timestamp and a second ID, wherein the first instance of the packet and the second instance of the packet contain an identical payload;

receiving, by the network controller and from the network device, first functionality data for the first component and second functionality data for the second component; and based at least in part on the first functionality data and the second functionality data, determining, by the network controller, whether to continue operating the first component and remove the second component, or continue operating the second component and remove the first component on the network device.

2. The method of claim 1, further comprising comparing, by the network controller, the first functionality data with the second functionality data using a validation template to determine whether to continue operating the first component or the second component on the network device.

3. The method of claim 2, wherein the first functionality data is a first convergence time, and the second functionality data is a second convergence time, and further comprising:

comparing, by the network controller, the first convergence time and the second convergence time; and determining, by the network controller and based at least in part on the comparing, whether the first component or the second component has a faster convergence time.

4. The method of claim 3, further comprising determining, by the network controller and based at least in part on determining that the second component has the faster convergence time, continue to operate the second component and remove the first component form the network device.

5. The method of claim 1, wherein the second component comprises:

a same software version and a different hardware configuration as the first component;

a different software version and a same hardware configuration as the first component;

or a different software version and a different hardware configuration as the first component.

6. The method of claim 1, wherein the network controller and the network device are part of a disaggregated network, and the first component is a first operating system (OS) component, and the second component is a second OS components.

7. The method of claim 1, wherein the first component is a first operating system (OS) component executing on a first route processor (RP) and the second component is a second OS component executing on a second RP.

8. A system comprising:

one or more processors; and one or more non-transitory computer-readable media storing computer-executable instructions that, when executed by the one or more processors, cause the one or more processors to perform operations comprising:

deploying, by a network controller and to a network device, a first component and a second component to run concurrently on the network device, wherein the second component is an upgraded version of the first component, and wherein the first component receives a first instance of a packet routed to the network device, the first instance of the packet having a timestamp and a first identifier (ID), and the second component receives a second instance of the packet routed to the network device, the second instance of the packet having the timestamp and a second ID, wherein the first instance of the packet and the second instance of the packet contain an identical payload;

receiving, by the network controller and from the network device, first functionality data for the first component and second functionality data for the second component; and based at least in part on the first functionality data and the second functionality data, determining, by the network controller, whether to continue operating the first component and remove the second component, or continue operating the second component and remove the first component on the network device.

9. The system of claim 8, the operations further comprising comparing, by the network controller, the first functionality data with the second functionality data using a validation template to determine whether to continue operating the first component of the second component on the network device.

10. The system of claim 9, wherein the first functionality data is a first convergence time, and the second functionality data is a second convergence time, and the operations further comprising:

comparing, by the network controller, the first convergence time and the second convergence time; and determining, by the network controller and based at least in part on the comparing, whether the first component or the second component has a faster convergence time.

11. The system of claim 10, the operations further comprising determining, by the network controller and based at least in part on determining that the second component has the faster convergence time, continue to operate the second component and remove the first component from the network device.

12. The system of claim 8, wherein the second component comprises:

a same software version and a different hardware configuration as the first component;

a different software version and a same hardware configuration as the first component;

or a different software version and a different hardware configuration as the first component.

13. The system of claim 8, wherein the network controller and the network device are part of a disaggregated network, and the first component and the second component are operating system (OS) components.

14. The system of claim 8, wherein the first component is a first operating system (OS) component executing on a first route processor (RP) and the second component is a second OS component executing on a second RP.

15. One or more non-transitory computer-readable media storing instructions that, when executed, cause one or more processors to perform operations comprising:

deploying, by a network controller and to a network device, a first component and a second component to run concurrently on the network device, wherein the second component is an upgraded version of the first component, and wherein the first component receives a first instance of a packet routed to the network device, the first instance of the packet having a timestamp and a first identifier (ID), and the second component receives a second instance of the packet routed to the network device, the second instance of the packet having the timestamp and a second ID, wherein the first instance of the packet and the second instance of the packet contain an identical payload;

receiving, by the network controller and from the network device, first functionality data for the first component and second functionality data for the second component; and based at least in part on the first functionality data and the second functionality data, determining, by the network controller, whether to continue operating the first component and remove the second component, or continue operating the second component and remove the first component on the network device.

16. The one or more non-transitory computer-readable media of claim 15, the operations further comprising comparing, by the network controller, the first functionality data with the second functionality data using a validation template to determine whether to continue operating the first component or the second component on the network device.

17. The one or more non-transitory computer-readable media of claim 16, wherein the first functionality data is a first convergence time, and the second functionality data is a second convergence time, and further comprising:

comparing, by the network controller, the first convergence time and the second convergence time; and determining, by the network controller and based at least in part on the comparing, whether the first component or the second component has a faster convergence time.

18. The one or more non-transitory computer-readable media of claim 17, the operations further comprising determining, by the network controller and based at least in part on determining that the second component has the faster convergence time, continue to operate the second component and remove the first component form the network device.

19. The one or more non-transitory computer-readable media of claim 15, wherein the network controller and the network device are part of a disaggregated network, and the first component is a first operating system (OS) component, and the second component is a second OS components.

20. The one or more non-transitory computer-readable media of claim 17, wherein the first component is a first operating system (OS) component executing on a first route processor (RP) and the second component is a second OS component executing on a second RP.

* * * * *